(12) United States Patent
Linden et al.

(10) Patent No.: US 9,414,303 B1
(45) Date of Patent: Aug. 9, 2016

(54) NETWORK ACCESS USING MOBILE BASE STATIONS

(71) Applicant: Kyynel Ltd, Oulu (FI)

(72) Inventors: Toni Linden, Oulu (FI); Matti Raustia, Oulu (FI); Teemu Vanninen, Oulu (FI)

(73) Assignee: Kyynel LTD, Oulu (FI)

( * ) Notice: Subject to any disclaimer, the term of this patent is extended or adjusted under 35 U.S.C. 154(b) by 0 days.

(21) Appl. No.: 14/598,683

(22) Filed: Jan. 16, 2015

(51) Int. Cl.
*H04W 4/00* (2009.01)
*H04W 68/00* (2009.01)
*H04W 48/16* (2009.01)

(52) U.S. Cl.
CPC .................................... *H04W 48/16* (2013.01)

(58) Field of Classification Search
CPC .............................. H04W 76/02; H04W 68/00
USPC ............... 455/458, 452.1, 456.2, 444, 432.1, 455/456.1; 370/312, 328, 311, 329, 466
See application file for complete search history.

(56) References Cited

U.S. PATENT DOCUMENTS

| 2008/0062945 | A1 | 3/2008 | Ahuja et al. | |
|---|---|---|---|---|
| 2009/0080360 | A1* | 3/2009 | Song | H04W 4/10 370/312 |
| 2012/0120892 | A1* | 5/2012 | Freda | H04W 8/005 370/329 |
| 2014/0119316 | A1 | 5/2014 | Linden et al. | |
| 2014/0280609 | A1* | 9/2014 | Averbeck | H04L 51/34 709/206 |
| 2014/0286262 | A1 | 9/2014 | Nasrabadi et al. | |

OTHER PUBLICATIONS

Extended European Search Report for Application No. 16150001.2-1854, mailed Jun. 14, 2016, 11 pages.

* cited by examiner

*Primary Examiner* — Kiet Doan
(74) *Attorney, Agent, or Firm* — Ziegler IP Law Group, LLC

(57) ABSTRACT

A method of operating a radio station is provided. One or more capability announcement messages are received from one or more other radio stations. The one or more capability announcement messages are analyzed to gather analyzed communication-capability information indicative of the one or more other radio stations that are available for communication and respective communication capabilities of the one or more other radio stations. Subsequently, a station map, maintained locally at the radio station, is updated with the communication-capability information. The station map is then used to select a target radio station for accessing a communication network.

18 Claims, 6 Drawing Sheets

NETWORK ACCESS USING MOBILE BASE STATIONS

TECHNICAL FIELD

The present disclosure relates generally to radio communications; and more specifically, to radio stations for facilitating network connectivity. Moreover, the present disclosure relates to methods of operating the aforesaid radio stations. Furthermore, the present disclosure also concerns computer program products comprising non-transitory machine-readable data storage media having stored thereon program instructions that, when accessed by processing devices of the aforesaid radio stations, cause the processing devices to perform the aforesaid methods.

BACKGROUND

Facilitating data communication in remote locations, especially in the Polar Regions and remote land and sea regions, is challenging. For instance, modern maritime vessels require data communications for receiving route information and route updates, while remote mining facilities require data communications for transmitting measurement data to a central operating office. Also, personnel working in such remote locations require data communication for sending or receiving emails, instant messages, and voice and/or video calls.

In general, there are various applications of facilitating data communication to remote regions. However, there exists a need of such data communication services at reasonable costs and with high data transfer speeds.

It has been known for a long time that radio waves operating in a High Frequency (HF) band can carry information over long distances, in some circumstances over 10000 km. The HF band is typically used by international shortwave broadcasting stations, aviation communication systems, maritime sea-to-shore services, government time stations, weather stations, amateur radio and citizens band services, and Global Maritime Distress and Safety System (GMDSS).

However, radio technologies conventionally used in the HF band are ill-suited for data communications. Moreover, building a network of base stations for providing a good network capacity and coverage in the remote regions would be costly.

Furthermore, satellite communications (SATCOM) has also been used conventionally for facilitating data communications in the remote regions. However, the satellite communications offer a poor service in the Polar Regions and are expensive.

SUMMARY

The present disclosure seeks to provide an improved radio communication apparatus.

The present disclosure also seeks to provide an improved method of operation a radio station.

A further aim of the present disclosure is to at least partially overcome at least some of the problems of the prior art, as discussed above.

In a first aspect, embodiments of the present disclosure provide a radio station comprising:
 a processor;
 a memory coupled to the processor; and
 at least one communication interface coupled to the processor, the at least one communication interface comprising a radio communication interface,
 wherein the processor is configured to:
  receive one or more capability announcement messages from one or more other radio stations, wherein a given capability announcement message comprises an identifier of a given radio station that transmitted the given capability announcement message and a network-access status of the given radio station;
  analyze the one or more capability announcement messages to gather analyzed communication-capability information indicative of the one or more other radio stations that are available for communication and respective communication capabilities of the one or more other radio stations;
  update a station map, maintained locally at the radio station, with the communication-capability information;
  use the station map to select a target radio station for accessing a communication network; and
  transmit one or more capability announcement messages to other radio stations.

In a second aspect, embodiments of the present disclosure provide a method of operating a radio station, the method comprising:
 receiving one or more capability announcement messages from one or more other radio stations, wherein a given capability announcement message comprises an identifier of a given radio station that transmitted the given capability announcement message and a network-access status of the given radio station;
 analyzing the one or more capability announcement messages to gather analyzed communication-capability information indicative of the one or more other radio stations that are available for communication and respective communication capabilities of the one or more other radio stations;
 updating a station map, maintained locally at the radio station, with the communication-capability information;
 using the station map to select a target radio station for accessing a communication network; and
 transmit one or more capability announcement messages to other radio stations.

In a third aspect, embodiments of the present disclosure provide a computer program product comprising a non-transitory machine-readable data storage medium having stored thereon program instructions that, when accessed by a processing device of a radio station, cause the processing device to:
 receive one or more capability announcement messages from one or more other radio stations, wherein a given capability announcement message comprises an identifier of a given radio station that transmitted the given capability announcement message and a network-access status of the given radio station;
 analyze the one or more capability announcement messages to gather analyzed communication-capability information indicative of the one or more other radio stations that are available for communication and respective communication capabilities of the one or more other radio stations;
 update a station map, maintained locally at the radio station, with the communication-capability information;
 use the station map to select a target radio station for accessing a communication network; and
 transmit one or more capability announcement messages to other radio stations.

Embodiments of the present disclosure substantially eliminate or at least partially address the aforementioned problems in the prior art, and enable radio stations to flexibly form an ad hoc network that can be used to access a communication network, such as the Internet, for data communication purposes.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
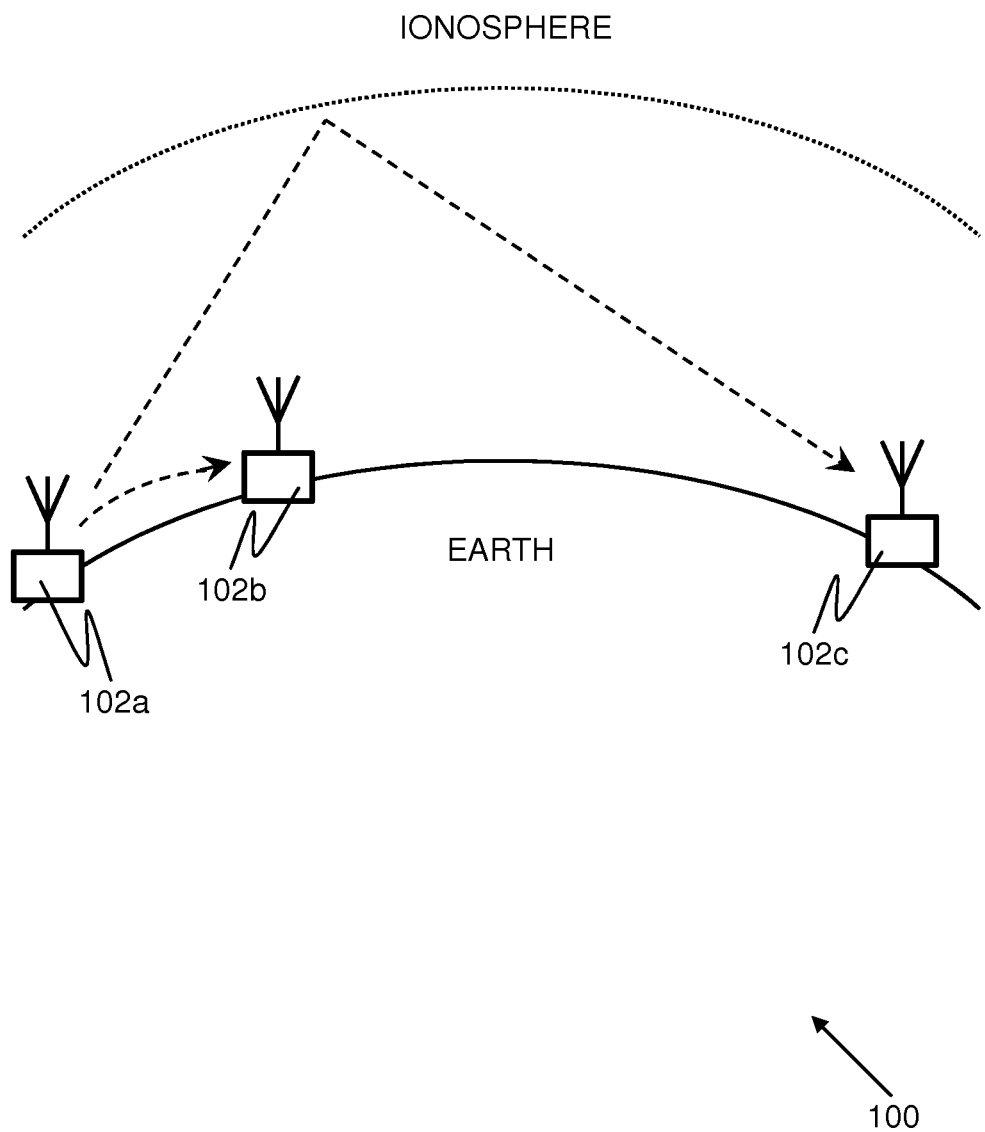
FIG. 1 is a schematic illustration of an example network environment that is suitable for practicing embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure has been disclosed, those skilled in the art would recognize that other embodiments for carrying out or practicing the present disclosure are also possible.

GLOSSARY

Brief definitions of terms used throughout the present disclosure are given below.

The term "radio station" generally refers to a communication apparatus that is capable of communicating with other similar communication apparatus using radio waves, via a radio communication interface. It is to be noted here that the term "radio station" only implies that the radio station can communicate using radio waves. In addition to the radio communication interface, the radio station can include other types of communication interfaces, which may be wired or wireless.

The term "base station" generally refers to a radio station that is fixed and has an access to a communication network, for example, such as the Internet. A base station is operable to relay network traffic to or from a mobile station.

The term "mobile station" generally refers to a radio station that is mobile.

The term "mobile base station" generally refers to a mobile station that is temporarily capable of acting as a base station. In other words, a mobile base station is a mobile station that has an access to a communication network, for example, such as the Internet. Thus, a mobile base station is operable to relay network traffic to or from a mobile station.

The term "ad hoc network" generally refers to a network that is established between a plurality of radio stations without any network planning with respect to infrastructure and/or frequency utilization.

The term "capability announcement message" generally refers to a message that a radio station transmits to announce its communication capabilities to other radio stations. A capability announcement message typically comprises an identifier of a radio station that transmitted the capability announcement message and a network-access status of the radio station.

The term "identifier" generally refers to an identification code that uniquely identifies a radio station. In an example, the identifier can be a Media Access Control (MAC) address of the radio station.

The term "network-access status" generally refers to a parameter that is indicative of whether or not a given radio station has an access to a communication network. An example of the communication network is the Internet.

The term "high frequencies" or "HF" generally refers to an International Telecommunication Union (ITU) designation for a range of radio frequencies between 3 MHz and 30 MHz.

The term "surface wave" generally refers to a radio wave that propagates close to a ground surface of the Earth.

The term "sky wave" generally refers to a radio wave that propagates by utilizing ionospheric refractions and/or reflections.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure Importantly, such phrases do not necessarily refer to the same embodiment.

If the specification states a component or feature "may", "can", "could", or "might" be included or have a characteristic, that particular component or feature is not required to be included or have the characteristic.

In a first aspect, embodiments of the present disclosure provide a radio station comprising:
- a processor;
- a memory coupled to the processor; and
- at least one communication interface coupled to the processor, the at least one communication interface comprising a radio communication interface,
- wherein the processor is configured to:
  - receive one or more capability announcement messages from one or more other radio stations, wherein a given capability announcement message comprises an identifier of a given radio station that transmitted the given capability announcement message and a network-access status of the given radio station;
  - analyze the one or more capability announcement messages to gather analysed communication-capability information indicative of the one or more other radio stations that are available for communication and respective communication capabilities of the one or more other radio stations;
  - update a station map, maintained locally at the radio station, with the communication-capability information;
  - use the station map to select a target radio station for accessing a communication network; and
  - transmit one or more capability announcement messages to other radio stations.

According to an embodiment, the given capability announcement message further comprises at least one of: a geographical location of the given radio station, and/or a time of transmission of the given capability announcement message.

According to an embodiment, the network-access status of the given radio station is indicative of whether or not the given radio station has an access to a communication network. An example of the communication network is the Internet.

In some embodiments, the one or more capability announcement messages are encrypted for security purposes. This may be particularly beneficial in a case where radio stations desire to communicate with only authorized radio stations.

According to an embodiment, the processor is configured to determine a connection channel to be used for communication with the target radio station, based on corresponding communication-capability information of the target radio station. Optionally, for this purpose, when a capability announcement message is received from a given radio station, the processor is configured to determine a connection channel on which the capability announcement message is received, and identify the connection channel as a preferred connection channel for the given radio station. Optionally, in this regard, the processor is configured to perform operations as described in respect of a published patent application US 2014/0119316 A1, hereby incorporated by reference in its entirety.

According to an embodiment, when analyzing the one or more capability announcement messages, the processor is configured to measure a received signal quality of each of the one or more capability announcement messages, i.e. to measure the quality of the received signal. Optionally, the received signal quality is measured in terms of one or more of: Signal-to-Noise Ratio (SNR), Signal-to-Interference-plus-Noise Ratio (SINR), and/or Modulation Error Ratio (MER). It is to be noted here that any other channel quality metric may be used.

According to an embodiment, when analyzing the one or more capability announcement messages, the processor is configured to measure a bitrate with which each of the one or more capability announcement messages is received.

According to an embodiment, when analyzing the one or more capability announcement messages, the processor is configured to determine a propagation mode of each of the one or more capability announcement messages. Optionally, in this regard, the processor is configured to determine whether a given capability announcement message was received as a surface wave or as a sky wave.

The determination of the propagation mode is for example based on propagation characteristics of radio waves. As ionospheric propagation introduces multipath, there are distinguishable echoes in a radio signal received by ionospheric propagation.

Optionally, in this regard, radio stations employ a code preamble that is mutually known to both transmitting and receiving radio stations. The code preamble is included in a capability announcement message. Examples of the code preamble include, but are not limited to, a Gold code and a Direct Sequence (DS) code. As an example, the code preamble can be 64 symbols long.

Optionally, the processor is configured to perform a correlation function between the code preamble and a received radio signal. If one visible spike is present, the received radio signal is determined to be a surface wave. On the other hand, if multiple spikes are present, the received radio signal is determined to be a sky wave. As the presence of multiple spikes is easily recognizable, the determination of the propagation mode can be performed by using a simple signal processing algorithm.

Moreover, all received radio signals need not to be processed to determine the propagation mode, as a distance between receiving and transmitting radio stations is known from their geographical locations and surface waves can only travel a certain distance affected by a time of day. In this regard, simple heuristics can be used. As an example, depending on a previous determination of a propagation mode for a given transmitting radio station and a time when the previous determination was made, a receiving radio station does not require to process other radio signals originating from the given transmitting radio station until there is a substantial change in a geographical location of at least one of the radio stations and/or in a distance between the radio stations.

As mentioned above, the communication-capability information comprises at least an identifier of a given radio station and a network-access status of the given radio station. According to an embodiment, the communication-capability information further comprises one or more of: a geographical location of the given radio station, a connection price. According to another embodiment, the analysed communication-capability information comprises one or more of: an available bitrate one or more connection channels preferred for communication by the given radio station, a signal quality per connection channel, a propagation mode per connection channel, an available quality of service per connection channel.

Moreover, the station map, maintained locally at the radio station, stores the communication-capability information. According to an embodiment, the station map is stored by way of one or more database tables.

For illustration purposes only, there will now be considered a first example table that is maintained locally at the radio station.

| Station ID | Network-Access Status | Multihop Network-Access Status | Location | Available Bitrate | Connection Price |
|---|---|---|---|---|---|
| X | Yes | Yes | 58° 36' 13.5216" N 4° 50' 2.3424" E | 150 kbps | 100 Euros |
| Y | No | No | 60° 28' 28.3764" N 26° 37' 51.0924" W | — | — |
| Z | Yes | Yes | 46° 2' 11.8896" N 2° 22' 22.9692" W | 100 kbps | 50 Euros |

A key 'Station ID' denotes an identifier of a given radio station, while a key 'Network-Access Status' denotes a network-access status of the given radio station. A key "Multihop Network-Access Status" denotes a network-access status of the given radio station over another radio station. A key 'Location' denotes a geographical location of the given radio station. The geographical location may, for example, be denoted by Global Positioning System (GPS) coordinates or latitudes and longitudes of the given radio station. The geographical location may be provided by Global Positioning System (GPS), Globalnaya navigatsionnaya sputnikovaya sistema (GLONASS) or other positioning or navigation system. A key 'Available Bitrate' denotes a bitrate that is available from the given radio station, while a key 'Connection Price' denotes a price that is associated to relaying a connection to a communication network, such as the Internet. The system can be configured to levy cost (or price) of connection to parties involved with relaying connection to the communication network. The cost can be the real cost related to telecommunication cost of a party which is connected to third party commercial telecommunication network such as cellular network cost or relative cost. The cost and revenues can be distributed as credit points, money, free communication time, membership points and so forth.

In the first example table, a value of 'YES' for the key 'Network-Access Status' indicates that a corresponding radio station has an access to the communication network. Such a radio station is capable of acting as a mobile base station.

In the first example table, a value 'YES' for the key "Multihop Network-Access Status" indicates that a corresponding radio station has an access to another radio station that has access to a radio station that is capable of acting as a mobile base station.

When a connection to the communication network is required, the radio station selects a target radio station, from amongst available mobile base stations, for accessing the communication network. Optionally, in this regard, the radio station prioritizes a list of available mobile base stations. Optionally, the available mobile base stations are prioritized based on one or more of: distances from the radio station, the available bitrates and/or the connection prices.

There will next be considered a second example table that is maintained locally at the radio station.

| Station ID | Radio Channel | Wave Mode | SNR | MER |
|---|---|---|---|---|
| X | Channel 1 | Sky wave | 2.4 | 6 dB |
| X | Channel 2 | Sky wave | 3 | 7 dB |
| X | Channel 3 | Surface wave | 4 | 10 dB |
| X | ... | ... | ... | ... |
| X | Channel 20 | Sky wave | 1.5 | 0 dB |
| Y | Channel 1 | Sky wave | 2.4 | 6 dB |
| Y | Channel 2 | Sky wave | 3 | 8 dB |
| Y | ... | ... | ... | ... |
| Y | Channel 20 | Surface wave | 1.5 | 0 dB |
| Z | Channel 1 | Sky wave | 2.4 | 6 dB |
| Z | Channel 2 | Sky wave | 3 | 8 dB |
| Z | ... | ... | ... | ... |
| Z | Channel 20 | Sky wave | 3 | 0 dB |

A key 'Radio Channel' denotes a given connection channel that is preferred for communication by a given radio station, while a key 'Wave Mode' denotes a propagation mode of the given connection channel. A key 'SNR' denotes an SNR value of the given connection channel, while a key 'MER' denotes an MER value of the given connection channel.

Once a target radio station is selected, the radio station selects a connection channel to be used for communication with the target radio station. The connection channel may, for example, be selected based on the SNR and MER values and/or the propagation mode.

Moreover, optionally, the processor can be configured to select the connection channel to be used depending on one or more antenna-specific parameters, for example, such as polarization. In such a case, additional entries are required to be added to the second example table to take into account a received signal quality per antenna, per polarization.

It is to be noted here that the station map can alternatively be stored as a single database table, wherein the single database table can have at least some keys of the first and second example tables.

Moreover, according to an embodiment, the processor is configured to operate as an email server.

Furthermore, the processor is configured to transmit one or more capability announcement messages to other radio stations. Optionally, the capability announcement messages are broadcast messages that are not addressed to any specific radio station. As a result, any radio station that is capable of receiving the capability announcement messages may process these capability announcement messages.

Optionally, in this regard, the processor is configured to perform operations as described in respect of a published patent application US 2014/0119316 A1, hereby incorporated by reference in its entirety. As an example, these operations comprise:

dividing a frequency band into a plurality of frequency blocks, each frequency block comprising a plurality of sub-bands (namely, connection channels);

scanning said sub-bands and estimating communication quality for said sub-bands;

selecting at least one sub-band per each frequency block; and transmitting said control message on each selected sub-band.

Moreover, the transmission of the capability announcement messages can be triggered on a time-basis or on a need-basis. Optionally, in this regard, the processor is configured to transmit the capability announcement messages periodically. A typical period may be, for example, every 10 minutes. Optionally, when transmitting the capability announcement messages on a time-basis, slight randomization can be used to avoid overlapping of radio signals received from different radio stations. Alternatively or additionally, optionally, the processor is configured to transmit the capability announcement messages upon detecting a change in communication capabilities of the radio station. In an example, the communication capabilities of the radio station with respect to sky waves may change depending on a time of day, a season of year, and a solar activity.

According to an embodiment, the processor is configured to exchange routing messages with other radio stations, wherein a given routing message transmitted by a given radio station comprises a list of radio stations that are reachable from the given radio station. This potentially enables a multi-hop access to the communication network. In an example, a first mobile station can connect to a second mobile station, which can then connect to a mobile base station, so as to provide the first mobile station with an access to the communication network. The message may be relayed, i.e. forwarded immediately after it has been received. This feature can also be used in connection with data on the intended route of for example a vessel. Indeed, non-urgent messages may be kept in a message buffer of a given radio station and forwarded later, once the radio station has reached a point where it has access to the communication network. The appropriate radio station to be used for such purpose may be determined based on the route plans of the mobile radio stations.

According to an embodiment, the radio communication interface is a High Frequency (HF) radio communication interface.

Furthermore, the aforementioned radio station can be implemented by way of a communication apparatus. An example of such a communication apparatus has been illustrated in conjunction with FIG. 3 as explained in more detail below.

The communication apparatus includes, but is not limited to, a Central Processing Unit (CPU), a memory, one or more radio receiver/transmitter (RX/TX) modems, and a power source.

The power source supplies electrical power to various components of the communication apparatus. The power source may, for example, be a battery or other suitable power storage means.

The memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

With the associated memory and program instructions stored thereon, the CPU is configured to control the communication apparatus.

Optionally, the radio RX/TX modems are operable to provide an HF radio communication interface. In this regard, the radio RX/TX modems enable radio communication within the HF band using various well-known modulation techniques.

Moreover, each of the radio RX/TX modems is connected via a corresponding amplifier to its corresponding antenna. In some examples, the communication apparatus employs more than 100 radio RX/TX modems along with amplifiers and antennae associated therewith. Each of these radio RX/TX modems has different communication characteristics, for example, different connection channel widths. Optionally, the CPU is configured to select at least one of these radio RX/TX modems for data communication. In this regard, the CPU can be configured to select the at least one of the radio RX/TX modems, depending on one or more antenna-specific parameters, for example, such as polarization.

Additionally, optionally, the CPU is configured to select a new radio RX/TX modem for data communication when a radio connection channel in use deteriorates substantially.

Optionally, the CPU is configured to encrypt the data communications for security purposes.

Moreover, the communication apparatus includes a cellular modem and an associated antenna for facilitating 2G, 3G or 4G telecommunications. In an example, the cellular modem can be employed to route Internet Protocol (IP) traffic from and to the communication apparatus. In another example, the cellular modem can be employed to route Voice over IP (VoIP), emails and instant messaging from and to the communication apparatus.

Optionally, the CPU is configured to operate various services, for example, such as an e-mail service, an Instant Messaging (IM) service, and so forth. Optionally, in this regard, the CPU is configured to operate as an email server. Additionally, optionally, the CPU is configured to operate as an IM server.

Moreover, optionally, the communication apparatus also includes a short-range radio and an associated antenna for facilitating, for example, a Wi-Fi network, a Bluetooth network or a similar network. In an example, the short-range radio can be used for communication in a proximity of the communication apparatus. In another example, when the communication apparatus is installed within a ship that is in a harbour, the short-range radio can be used to connect the communication apparatus to a WLAN network of the harbour.

Moreover, optionally, the communication apparatus includes wired connection means for connecting the communication apparatus to an external device. In an example, the wired connection means can be used to connect the communication apparatus to an Ethernet, for example, such as an intranet of a vessel or a facility in which the communication apparatus is installed. In another example, the wired connection means can be used to connect to a Universal Serial Bus (USB) connection.

Furthermore, optionally, the communication apparatus includes a Global Positioning System (GPS) unit for determining a geographical location of the communication apparatus. Such GPS units may, for example, be used to determine geographical locations of communication apparatus that are installed within maritime vessels.

For illustration purposes only, there will now be considered an example network environment, wherein a plurality of radio stations are implemented pursuant to embodiments of the present disclosure. An example network environment has been illustrated in conjunction with FIG. 1 as explained in more detail below.

Embodiments of the present disclosure may be realized in an ad hoc radio network comprising the plurality of radio stations.

These radio stations may be operationally equivalent to each other. At least some of these radio stations are free to move. At least one of these radio stations is configured to relay data packets from or to one or more other radio stations.

At least some of the radio stations have a very long communication range, and are capable of communicating directly with radio stations on the other side of the Earth.

The radio stations have transmit powers ranging from a few Watts (for example, 20 W) to even kilo Watts, depending on a type of power supply employed. For example, a radio station installed within a building, a truck, or a ship may utilize high transmit powers, while a radio station installed within a handheld device may be limited to a few Watts.

Optionally, the radio stations utilize a frequency band comprising a High Frequency (HF) band. It is to be noted here that the radio stations may utilize other frequency bands, for example, such as a Very High Frequency (VHF) band or an Ultra-High Frequency (UHF) band. An advantage of HF radio waves is their long propagation range, and a fact that they may propagate via several types of communication paths, namely surface waves and sky waves.

Thus, the radio stations are configured to support radio communications on the HF band from which actual transmission frequencies can be selected according to a sub-method as described in US 2014/0119316 A1. The supported frequency band may be either continuous or divided into a plurality of frequency bands separated from each other. The division may be based on a fact that there are other radio stations occupying some frequencies that may have a priority to occupy those frequencies, while the radio stations have to adapt to the frequency occupation of the other radio stations. In an embodiment, various radio stations occupying a same frequency band have an equal priority to the frequency occupation. In this embodiment, the radio stations may utilize cognitive channel selection procedures as described in US 2014/0119316 A1, to avoid collisions between the radio stations.

Accordingly, the radio stations can be configured to use certain frequency bands, for example, depending on a bandwidth license that is issued to them.

For illustrations purposes only, there will now be considered that each of the plurality of radio stations in the above example network environment is typically implemented within a maritime vessel. Examples of such a maritime vessel include, but are not limited to, a cargo ship, a passenger ship, a special-purpose ship, a ferry, and a boat. As a result, each of the plurality of radio stations is mobile, and is hereinafter referred to as a "mobile station".

A mobile station having an access to a communication network can act as a mobile base station for other reachable mobile stations. In other words, the other reachable mobile stations can relay their network traffic through the mobile base station. When a maritime vessel reaches a coastal area, for example, such as a harbour, a mobile station implemented within the maritime vessel can access one or more communication networks and can act as a mobile base station. Examples of such communication networks include, but are not limited to, Local Area Networks (LANs), Wide Area Networks (WANs), Wireless LANs (WLANs), Wireless WANs (WWANs), the Internet, second generation (2G) telecommunication networks, third generation (3G) telecommunication networks, fourth generation (4G) telecommunication networks, and Worldwide Interoperability for Microwave Access (WiMAX) networks.

Each mobile station and/or mobile base station broadcasts capability announcement messages. Optionally, each mobile station and/or mobile base station broadcasts these capability announcement messages on a plurality of preferred connection channels.

When a given mobile station receives a capability announcement message, the given mobile station analyzes the capability announcement message to perform one or more of:
(i) identify a radio station that transmitted the capability announcement message (hereinafter referred to as "transmitting radio station") from an identifier included within the capability announcement message;
(ii) determine, from a network-access status included within the capability announcement message, whether or not the transmitting radio station has an access to a communication network, for example, such as the Internet;
(iii) determine a geographical location of the transmitting radio station;
(iv) determine, from a time of transmission included within the capability announcement message, whether or not the capability announcement message is a repetition interference;
(v) discard the capability announcement message, if it is a repetition interference;
(vi) determine a connection channel used to transmit the capability announcement message as one of preferred connection channels for the transmitting radio station;
(vii) measure a received signal quality of the connection channel;
(viii) determine a propagation mode of the connection channel;
(ix) determine an available Quality-of-Service (QoS) for the connection channel;
(x) measure a bitrate with which the capability announcement message is received from the transmitting radio station; and/or
(xi) determine a connection price to be paid for a network connection facilitated by the transmitting radio station.

In this manner, each mobile station and/or mobile base station analyzes capability announcement messages that it receives to gather communication-capability information and updates its station map with the gathered information.

Moreover, a given mobile station can communicate with one or more mobile base stations that are within a coverage area of the given mobile station. For this purpose, the given mobile station can communicate either with a lower bit rate via sky waves, or with a higher bit rate if radio communication via surface waves is available.

Moreover, while maritime vessels sail through water bodies, their geographical locations change. As a result, a given mobile station may become unreachable to one or more mobile stations and/or mobile base stations to which it was earlier reachable, and may become reachable to one or more new mobile stations and/or mobile base stations. Therefore, in order to update other mobile stations and/or mobile base stations with their latest communication capabilities, the mobile stations and/or mobile base stations broadcast capability announcement messages repeatedly.

Furthermore, propagation characteristics of sky waves are highly dependent on a connection channel used, a time of day, a location and ionospheric conditions. An example of how the propagation characteristics may change has been illustrated in conjunction with FIGS. 4A-D as explained in more detail below. Thus, in order to update each other, the mobile stations and/or mobile base stations broadcast capability announcement messages on a time-basis or on a need-basis.

Later, when a given mobile station requires a connection to a communication network, the given mobile station uses its station map to select a mobile base station for accessing the communication network, as described earlier. An example signal workflow has been illustrated in conjunction with FIG. 2 as explained in more detail below.

Moreover, optionally, each mobile station and/or mobile base station can be configured to provide various service levels within the ad hoc radio network. As an example, various types of service levels that can be provided within the ad hoc radio network include at least one of:
(i) relay of emergency messages from or to a mobile station;
(ii) relay of important messages from or to the mobile station; and
(iii) relay of IP traffic related to passengers or crew of a maritime vessel.

An example of the emergency messages could be a distress call made by a captain of a ship. Some examples of the important messages include, but are not limited to, messages pertaining to route information to be used by a ship, a weather forecast information, and a fuel consumption information. The service levels (i) and (ii) typically require only small amounts of data to be transmitted.

Some examples of the IP traffic related to the passengers or the crew of the maritime vessel include, but are not limited to, IP traffic related to emails, instant messages, VoIP, and Internet browsing. The service level (iii) typically requires large amounts of data to be transmitted. The service level (iii) may also require longer communication sessions with a different quality of service, as compared to the service levels (i) and (ii).

Therefore, each mobile station can be configured to perform the selection of a mobile base station for accessing the communication network, based on a desired service level.

In a second aspect, embodiments of the present disclosure provide a method of operating a radio station, the method comprising:

receiving one or more capability announcement messages from one or more other radio stations, wherein a given capability announcement message comprises an identifier of a given radio station that transmitted the given capability announcement message and a network-access status of the given radio station;

analyzing the one or more capability announcement messages to gather analyzed communication-capability information indicative of the one or more other radio stations that are available for communication and respective communication capabilities of the one or more other radio stations;

updating a station map, maintained locally at the radio station, with the communication-capability information;

using the station map to select a target radio station for accessing a communication network; and transmitting one or more capability announcement messages to other radio stations.

According to an embodiment, the method further comprises determining a connection channel to be used for communication with the target radio station, based on corresponding communication-capability information of the target radio station.

According to an embodiment, the analyzing the one or more capability announcement messages comprises measuring a received signal quality of each of the one or more capability announcement messages.

According to an embodiment, the analyzing the one or more capability announcement messages comprises determining a propagation mode of each of the one or more capability announcement messages.

According to an embodiment, the given capability announcement message further comprises at least one of: a geographical location of the given radio station, a time of transmission of the given capability announcement message.

According to an embodiment, the communication-capability information further comprises one or more of: a geographical location of the given radio station, a connection price. According to another embodiment, the analyzed communication-capability information comprises one or more of: an available bitrate, one or more connection channels preferred for communication by the given radio station, a signal quality per connection channel, a propagation mode per connection channel, an available quality of service per connection channel.

As mentioned above, the method further comprises transmitting one or more capability announcement messages to other radio stations.

According to an embodiment, the method further comprises exchanging routing messages with other radio stations, wherein a given routing message transmitted by a given radio station comprises a list of radio stations that are reachable from the given radio station.

In a third aspect, embodiments of the present disclosure provide a computer program product comprising a non-transitory machine-readable data storage medium having stored thereon program instructions that, when accessed by a processing device of a radio station, cause the processing device to:

receive one or more capability announcement messages from one or more other radio stations, wherein a given capability announcement message comprises an identifier of a given radio station that transmitted the given capability announcement message and a network-access status of the given radio station;

analyze the one or more capability announcement messages to gather analyzed communication-capability information indicative of the one or more other radio stations that are available for communication and respective communication capabilities of the one or more other radio stations;

update a station map, maintained locally at the radio station, with the communication-capability information;

use the station map to select a target radio station for accessing a communication network; and transmit one or more capability announcement messages to other radio stations.

According to an embodiment, the communication-capability information comprises one or more of: a geographical location of the given radio station, a connection price. According to another embodiment, the analyzed communication-capability information comprises one or more of: an available bitrate, one or more connection channels preferred for communication by the given radio station, a signal quality per connection channel, a propagation mode per connection channel, an available quality of service per connection channel.

DETAILED DESCRIPTION OF DRAWINGS

Referring now to the drawings, particularly by their reference numbers, FIG. 1 is a schematic illustration of an example network environment 100 that is suitable for practicing embodiments of the present disclosure. The network environment 100 includes a plurality of radio stations, depicted as a radio station 102a, a radio station 102b and a radio station 102c in FIG. 1. The radio stations 102a, 102b and 102c are hereinafter collectively referred to as radio stations 102.

Embodiments of the invention may be realized in an ad hoc network comprising the radio stations 102.

In FIG. 1, there is illustrated a scenario where the radio station 102a communicates with the radio station 102b via surface waves that propagate close to the ground surface of the Earth, and communicates with the radio station 102c on the other side of the Earth via sky waves that propagate by utilizing refractions from the ionosphere.

FIG. 1 is merely an example, which should not unduly limit the scope of the present disclosure. It is to be understood that the illustration of the network environment 100 is provided as an example and is not limited to a specific number and/or arrangement of radio stations. A person skilled in the art will recognize many variations, alternatives, and modifications of embodiments of the present disclosure.

Figure 2:
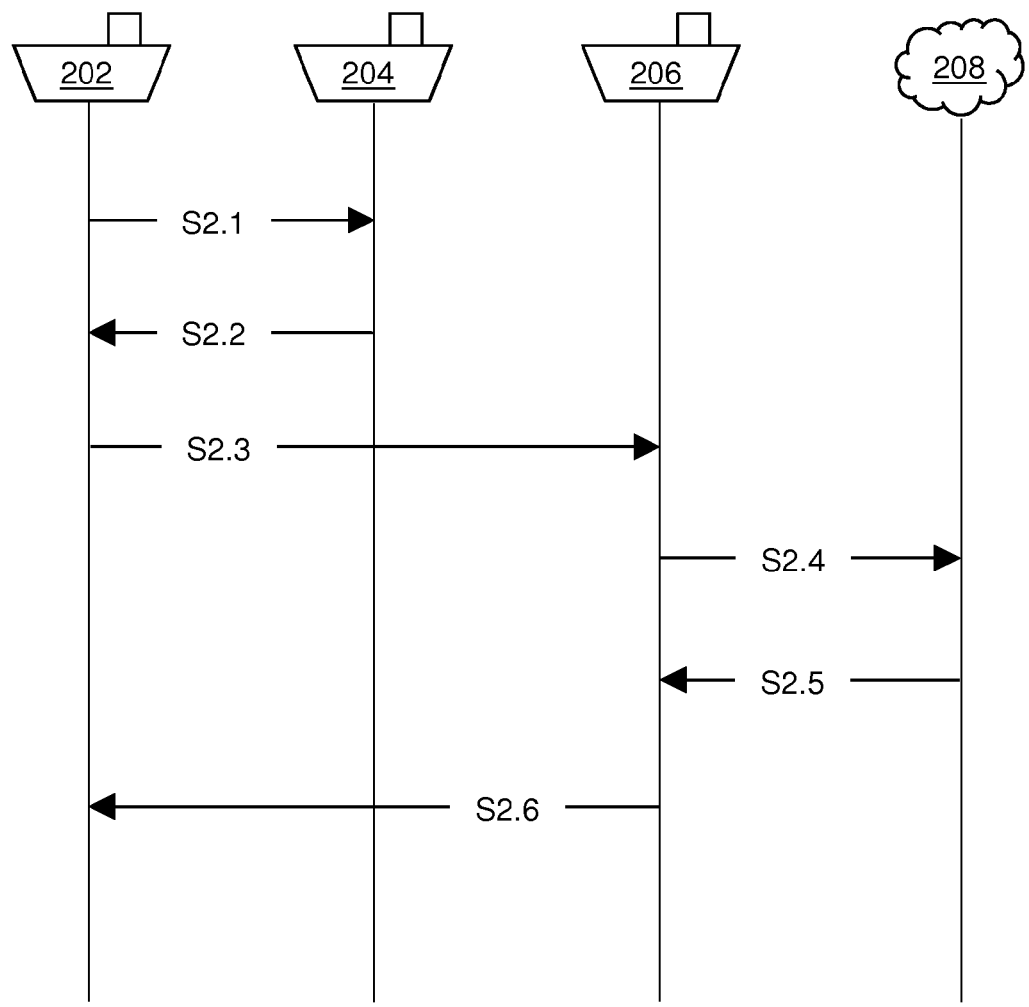
FIG. 2 is a schematic illustration of an example signal workflow, in accordance with an embodiment of the present disclosure.

FIG. 2 is a schematic illustration of an example signal workflow, in accordance with an embodiment of the present disclosure. In FIG. 2, there are shown a mobile station 202, a mobile base station 204 and a mobile base station 206. For illustration purposes only, there will now be considered an example wherein each of the mobile station 202 and the mobile base stations 204 and 206 is installed within a maritime vessel. In the example, a maritime vessel of the mobile station 202 is in a sea, while maritime vessels of the mobile base stations 204 and 206 are in their respective harbours. As a result, the mobile station 202 has no direct access to the Internet 208, while the mobile base stations 204 and 206 have an access to the Internet 208.

The example signal workflow corresponds to a situation when the mobile station 202 requires an Internet connection to access a web service available on the Internet 208.

As described earlier, the mobile station 202 maintains a station map locally, and uses the station map to prioritize available mobile base stations, namely the mobile base stations 204 and 206. In the above example, let us assume that the mobile base station 204 has a higher priority than the mobile base station 206.

At a step S2.1, the mobile station 202 connects to the mobile base station 204 and transmits a request message for an Internet access. The request message may, for example, include at least one of: a geographical location of the mobile station 202, and/or information related to a radio environment as observed by the mobile station 202, in addition to an identifier of the mobile station 202.

In the example, let us assume that the mobile base station 204 is unable to provide an Internet access to the mobile station 202. This may, for example, be a case when the mobile base station 204 requires a full bandwidth or if the mobile base station 204 has just lost the Internet connection. Thus, at a step S2.2, the mobile base station 204 transmits a message to the mobile station 202 indicating its inability to provide the Internet access. The message may, for example, include an updated network-access status and other related parameters.

Next, at a step S2.3, the mobile station 202 connects to the mobile base station 206 and transmits a request message for an Internet access.

At a step S2.4, the mobile base station 206 connects to the web service available on the Internet 208.

Subsequently, at steps S2.5 and S2.6, the mobile base station 206 routes IP traffic from the Internet 208 to the mobile station 202. As a result, the mobile station 202 has an Internet connection, wherein IP packets are routed via the mobile base station 206.

For illustration purposes only, there will now be considered an example wherein the mobile station 202 has a local email server, and requires an access to an email service on the Internet 208. When a passenger on the maritime vessel sends an email, the email is received and stored at the local email server. When the mobile station 202 connects to an available mobile base station, the local email server of the mobile station 202 sends the email to the available mobile base station, which then relays the email to the email service on the Internet 208.

Optionally, the local email server is configured to remove unnecessary header information from the email, so as to reduce an amount of data to be transmitted. Additionally, optionally, the mobile base station or the email service on the Internet 208 can be configured to add necessary information back to a header of the email before forwarding it further towards a recipient of the email.

FIG. 2 is merely an example, which should not unduly limit the scope of the present disclosure. A person skilled in the art will recognize many variations, alternatives, and modifications of embodiments of the present disclosure.

Figure 3:
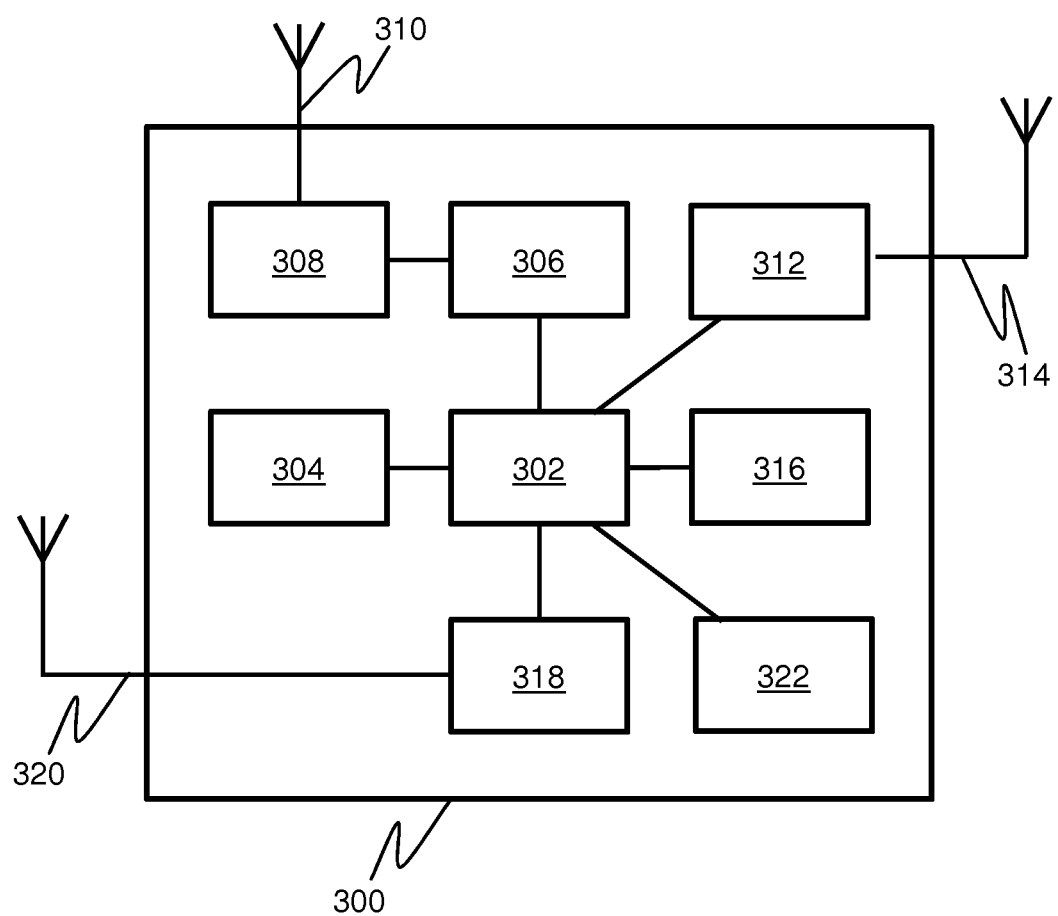
FIG. 3 is a schematic illustration of various components in an example implementation of a communication apparatus, in accordance with an embodiment of the present disclosure.

FIG. 3 is a schematic illustration of various components in an example implementation of a communication apparatus 300, in accordance with an embodiment of the present disclosure. The communication apparatus 300 includes, but is not limited to, a CPU 302, a memory 304, one or more radio RX/TX modems 306, amplifiers 308 and antennae 310 associated therewith, a cellular modem 312 and an associated antenna 314, and a power source 316. Optionally, the communication apparatus 300 also includes a short-range radio 318 and an associated antenna 320. Moreover, optionally, the communication apparatus 300 includes wired connection means 322.

FIG. 3 is merely an example, which should not unduly limit the scope of the claims herein. It is to be understood that the specific designation for the communication apparatus 300 is provided as an example and is not to be construed as limiting the communication apparatus 300 to specific numbers, types, or arrangements of modules and/or components of the communication apparatus 300. A person skilled in the art will recognize many variations, alternatives, and modifications of embodiments of the present disclosure.

FIGS. 4A, 4B, 4C and 4D are schematic illustrations of example variations in propagation properties of sky waves.

In FIGS. 4A-D, there is shown a mobile station 410, which is installed within a maritime vessel travelling on a northern route. There are also shown mobile base stations 412a, 412b, 412c, 412d and 412e (hereinafter collectively referred to as mobile base stations 412). The mobile base stations 412 are installed within maritime vessels that are located in their respective harbours.

In FIGS. 4A-D, there is also shown a limit of usable communication 420. The limit of usable communication 420 defines a region within which radio waves can propagate as sky waves. This region typically lies inside circles or north of a line. In particular, this region lies north of a line shown in FIGS. 4A and 4B, and lies inside circles shown in FIGS. 4C and 4D.

Figure 4A:
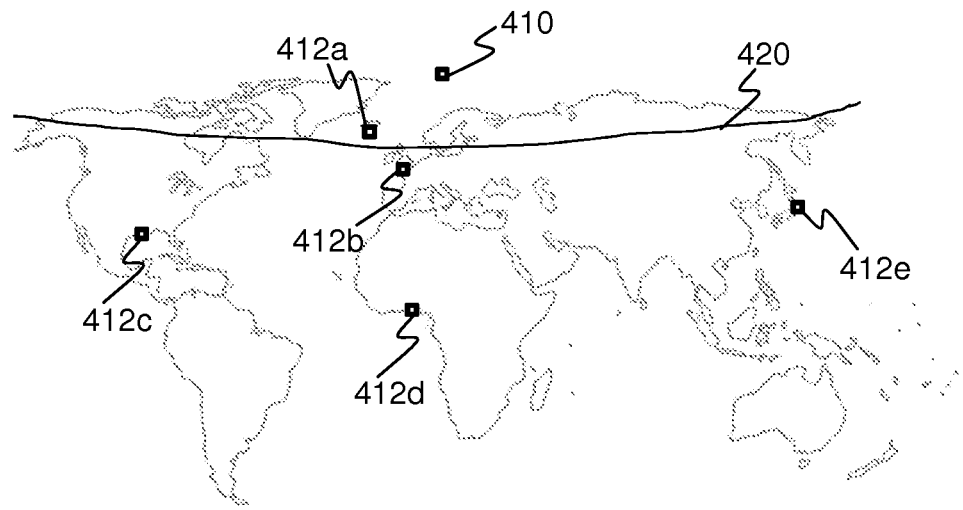
FIGS. 4A, 4B, 4C and 4D are schematic illustrations of example variations in propagation properties of sky waves.
Figure 4B:
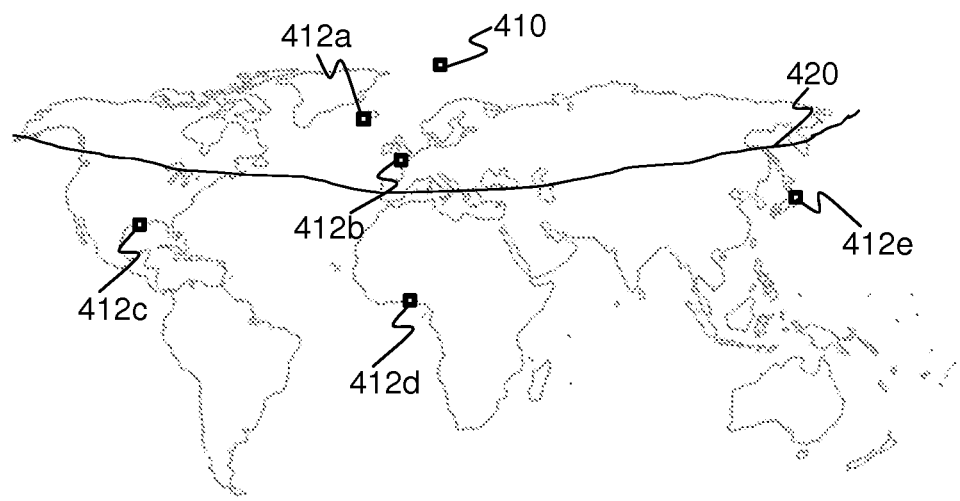

FIGS. 4A and 4B correspond to radio communications occurring via a connection channel of 3.7 MHz using a transmission power of 100 W. Moreover, FIG. 4A corresponds to the radio communications occurring at Coordinated Universal Time (UTC) 00:00 hours, while FIG. 4B corresponds to the radio communications occurring at UTC 12:00 hours.

Figure 4C:
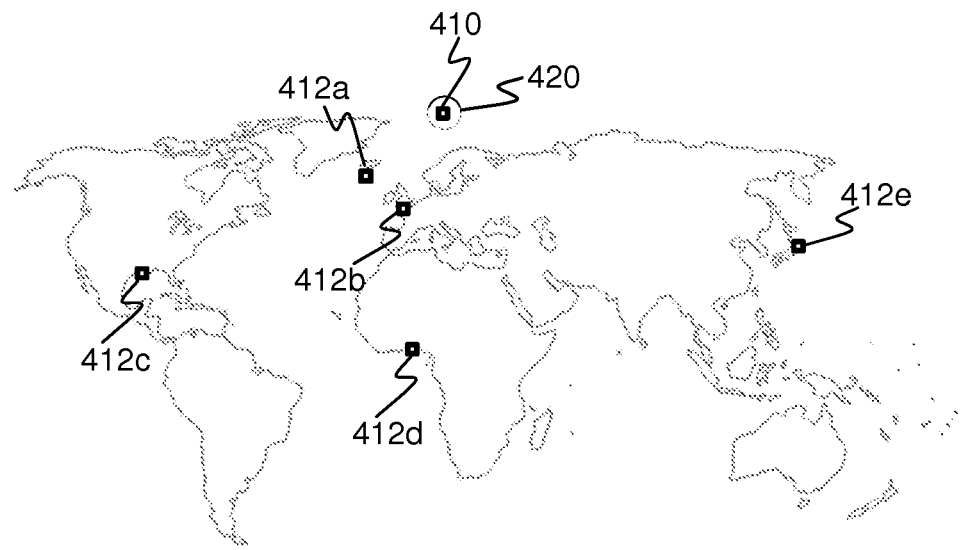
Figure 4D:
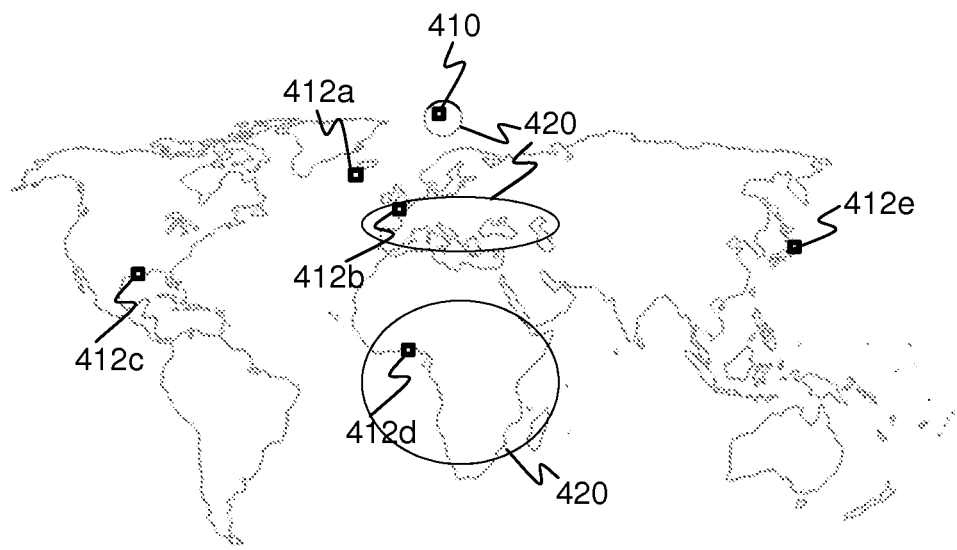

FIGS. 4C and 4D correspond to radio communications occurring via a connection channel of 28 MHz using a transmission power of 100 W. FIG. 4C corresponds to the radio communications occurring at UTC 00:00 hours, while FIG. 4D corresponds to the radio communications occurring at UTC 12:00 hours.

Moreover, FIGS. 4A-D correspond to the radio communications occurring on a same day.

It is evident from FIGS. 4A and 4B that, when using the connection channel of 3.7 MHz, the mobile station 410 can communicate with only the mobile base station 412a at UTC 00:00 hours, but can communicate with the mobile base stations 412a and 412b at UTC 12:00 hours. Likewise, it is evident from FIGS. 4C and 4D that, when using the connection channel of 28 MHz, the mobile station 410 cannot communicate with any mobile base station at UTC 00:00 hours, but can communicate with the mobile base stations 412b and 412d at UTC 12:00 hours.

It is to be appreciated that radio communications via sky waves are dependent on a time of the day, a connection channel used and a location, and may be significantly irregular. Thus, in order to update each other, the mobile station 410 and the mobile base stations 412 broadcast capability announcement messages on a time-basis or on a need-basis, as described earlier.

FIGS. 4A-D are merely examples, which should not unduly limit the scope of the present disclosure. A person skilled in the art will recognize many variations, alternatives, and modifications of embodiments of the present disclosure.

Figure 5:
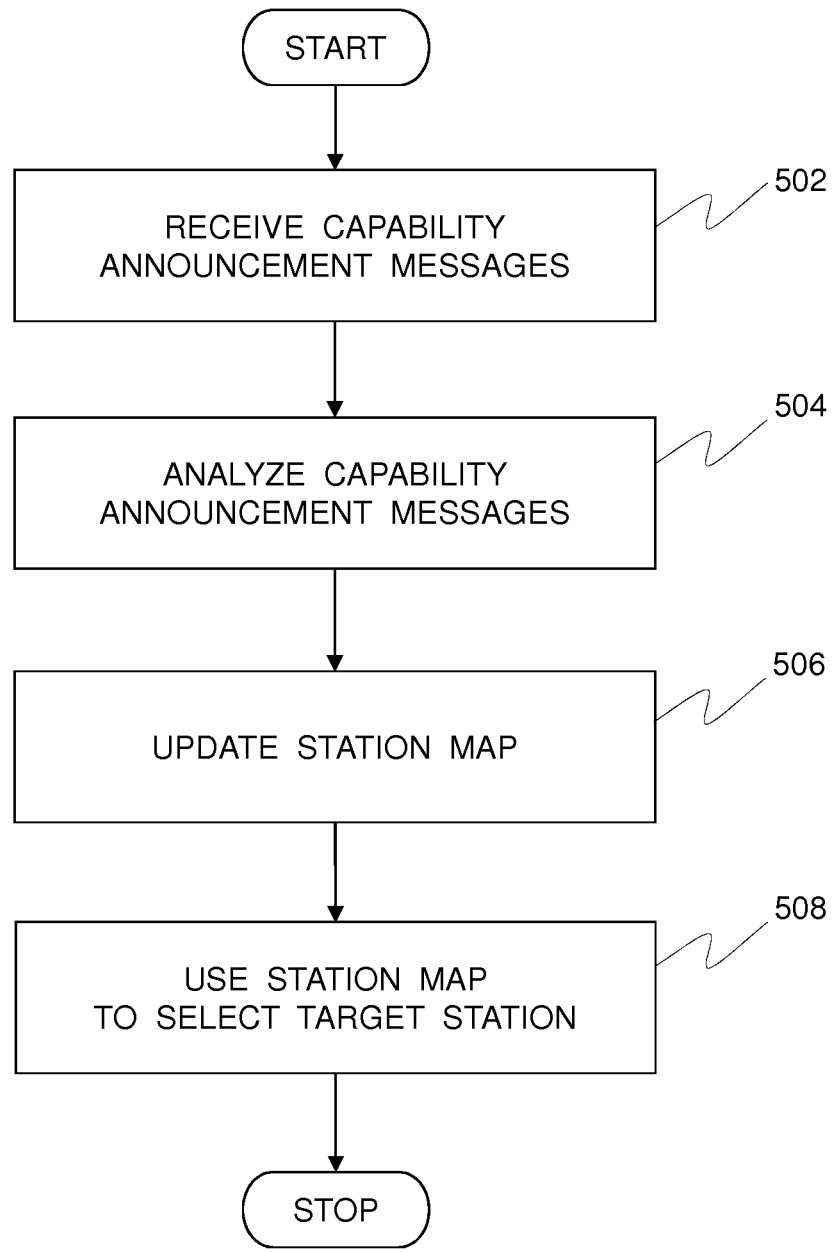
FIG. 5 is an illustration of steps of a method of operating a radio station, in accordance with an embodiment of the present disclosure.

FIG. 5 is an illustration of steps of a method of operating a radio station, in accordance with an embodiment of the present disclosure. The method is depicted as a collection of steps in a logical flow diagram, which represents a sequence of steps that can be implemented in hardware, software, or a combination thereof.

At a step 502, the radio station receives one or more capability announcement messages from one or more other radio stations. Optionally, in accordance with the step 502, the radio station listens to a plurality of connection channels concurrently.

Next, at a step 504, the radio station analyzes the one or more capability announcement messages to gather communication-capability information indicative of the one or more other radio stations that are available for communication and respective communication capabilities of the one or more other radio stations.

Subsequently, at a step 506, the radio station updates a station map, which is maintained locally at the radio station, with the communication-capability information gathered at the step 504.

When the radio station requires an access to a communication network, a step 508 is performed. At the step 508, the radio station uses the station map to select a target radio station for accessing the communication network.

The steps 502 to 508 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, enabling radio stations to flexibly form an ad hoc network that can be used to access a communication network, such as the Internet, for data communication purposes.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A radio station comprising:
   a processor;
   a memory coupled to the processor; and
   at least one communication interface coupled to the processor, the at least one communication interface comprising a radio communication interface,
   wherein the processor is configured to:
   receive one or more capability announcement messages from one or more other radio stations, wherein a given capability announcement message comprises an identifier of a given radio station that transmitted the given capability announcement message and a network-access status of the given radio station;
   analyze the one or more capability announcement messages to gather analyzed communication-capability information indicative of the one or more other radio stations that are available for communication and respective communication capabilities of the one or more other radio stations;
   determine a propagation mode of each of the one or more capability announcement messages to identify whether a capability announcement message is a surface wave or a sky wave;
   update a station map, maintained locally at the radio station, with the communication-capability information;
   use the station map to select a target radio station for accessing a communication network; and
   transmit one or more capability announcement messages to other radio stations;
   wherein when analyzing the one or more capability announcement messages, the processor is configured to determine the propagation mode of each of the one or more capability announcement messages by performing a correlation function between a code preamble and a received radio signal.

2. The radio station of claim 1, wherein the processor is configured to determine a connection channel to be used for communication with the target radio station, based on corresponding communication-capability information of the target radio station.

3. The radio station of claim 1, wherein when analyzing the one or more capability announcement messages, the processor is configured to measure quality of received signal of each of the one or more capability announcement messages.

4. The radio station of claim 1, wherein the given capability announcement message further comprises at least one of: a geographical location of the given radio station, a time of transmission of the given capability announcement message.

5. The radio station of claim 1, wherein the network-access status of the given radio station is indicative of whether or not the given radio station has an access to the Internet.

6. The radio station of claim 1, wherein the communication-capability information comprises one or more of: a geographical location of the given radio station, a connection price.

7. The radio station of claim 1, wherein the analyzed communication-capability information comprises one or more of: an available bitrate, one or more connection channels preferred for communication by the given radio station, a signal quality per connection channel, a propagation mode per connection channel, an available quality of service per connection channel.

8. The radio station of claim 1, wherein the processor is configured to exchange routing messages with other radio stations, wherein a given routing message transmitted by a given radio station comprises a list of radio stations that are reachable from the given radio station.

9. The radio station of claim 1, wherein the radio communication interface is a high frequency radio communication interface.

10. A method of operating a radio station, the method comprising:
    receiving one or more capability announcement messages from one or more other radio stations, wherein a given capability announcement message comprises an identifier of a given radio station that transmitted the given capability announcement message and a network-access status of the given radio station;
    analyzing the one or more capability announcement messages to gather analyzed communication-capability information indicative of the one or more other radio stations that are available for communication and respective communication capabilities of the one or more other radio stations;

determining a propagation mode of each of the one or more capability announcement messages to identify whether a capacity announcement message is a surface wave or a sky wave;

updating a station map, maintained locally at the radio station, with the communication-capability information;

using the station map to select a target radio station for accessing a communication network; and transmitting one or more capability announcement messages to other radio stations;

wherein the analyzing the one or more capability announcement messages comprises determining the a propagation mode of each of the one or more capability announcement messages by performing a correlation function between a code preamble and a received radio signal.

11. The method of claim 10 further comprising determining a connection channel to be used for communication with the target radio station, based on corresponding communication-capability information of the target radio station.

12. The method of claim 10, wherein the analyzing the one or more capability announcement messages comprises measuring a received signal quality of each of the one or more capability announcement messages.

13. The method of claim 10, wherein the given capability announcement message further comprises at least one of: a geographical location of the given radio station, a time of transmission of the given capability announcement message.

14. The method of claim 10, wherein the communication-capability information comprises one or more of: a geographical location of the given radio station, a connection price.

15. The method of claim 10, wherein the analyzed communication-capability information comprises one or more of: an available bitrate, one or more connection channels preferred for communication by the given radio station, a signal quality per connection channel, a propagation mode per connection channel, an available quality of service per connection channel.

16. The method of claim 10 further comprising exchanging routing messages with other radio stations, wherein a given routing message transmitted by a given radio station comprises a list of radio stations that are reachable from the given radio station.

17. A computer program product comprising a non-transitory machine-readable data storage medium having stored thereon program instructions that, when accessed by a processing device of a radio station, cause the processing device to:

receive one or more capability announcement messages from one or more other radio stations, wherein a given capability announcement message comprises an identifier of a given radio station that transmitted the given capability announcement message and a network-access status of the given radio station;

analyze the one or more capability announcement messages to gather analyzed communication-capability information indicative of the one or more other radio stations that are available for communication and respective communication capabilities of the one or more other radio stations;

determining a propagation mode of each of the one or more capability announcement messages to identify whether a capacity announcement message is a surface wave or a sky wave;

updating a station map, maintained locally at the radio station, with the communication-capability information;

using the station map to select a target radio station for accessing a communication network; and transmitting one or more capability announcement messages to other radio stations;

wherein the analyzing the one or more capability announcement messages comprises determining the a propagation mode of each of the one or more capability announcement messages by performing a correlation function between a code preamble and a received radio signal.

18. The computer program product of claim 17, wherein the communication-capability information comprises one or more of: a geographical location of the given radio station, a connection price, and/or the analysed communication-capability information comprises one or more of: an available bitrate, one or more connection channels preferred for communication by the given radio station, a signal quality per connection channel, a propagation mode per connection channel, an available quality of service per connection channel.

* * * * *